March 6, 1945. W. R. PERRY ET AL 2,370,992
REVOLUTION INDICATOR
Filed Aug. 3, 1940 4 Sheets-Sheet 1
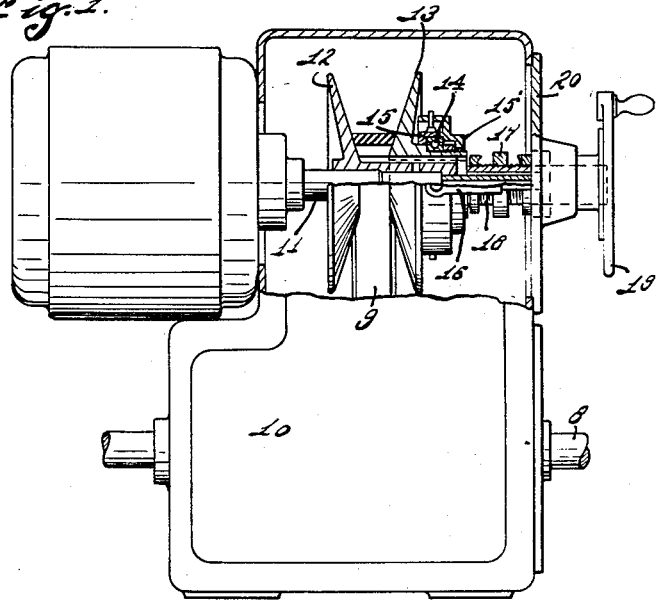
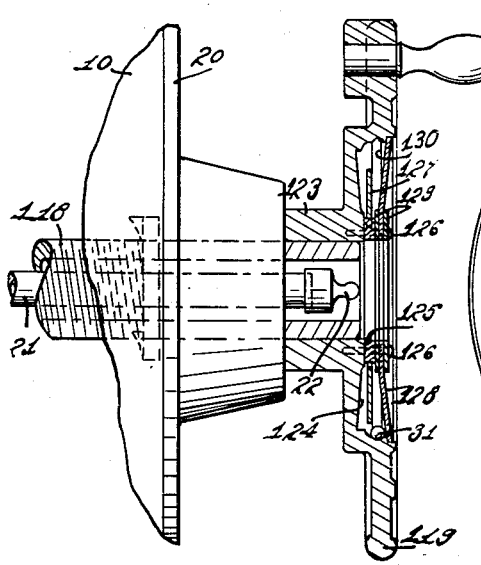
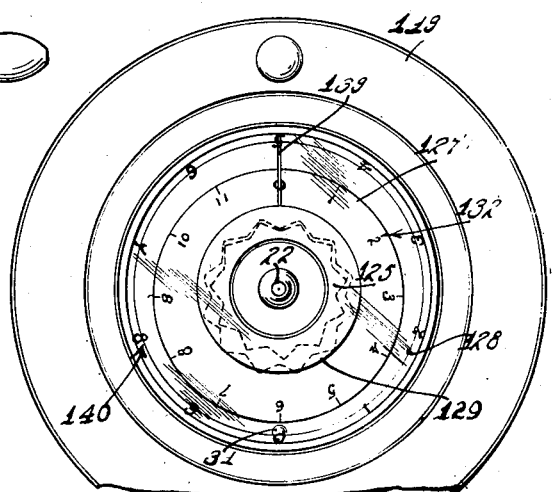
INVENTOR.
William R. Perry and
Paul B. Roews,
BY
Hood & Hahn.
ATTORNEYS.

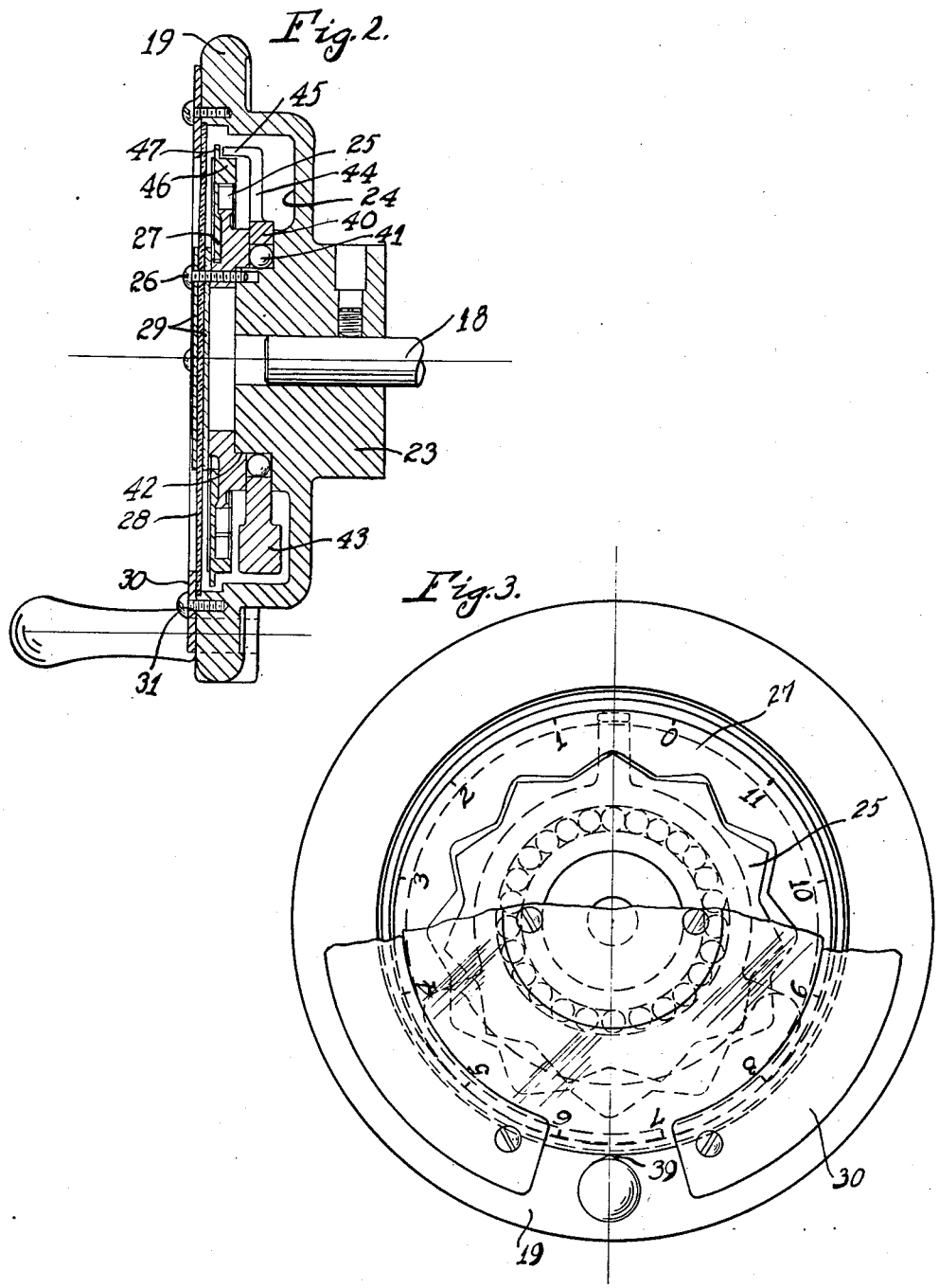

March 6, 1945.  W. R. PERRY ET AL  2,370,992
REVOLUTION INDICATOR
Filed Aug. 3, 1940  4 Sheets-Sheet 3
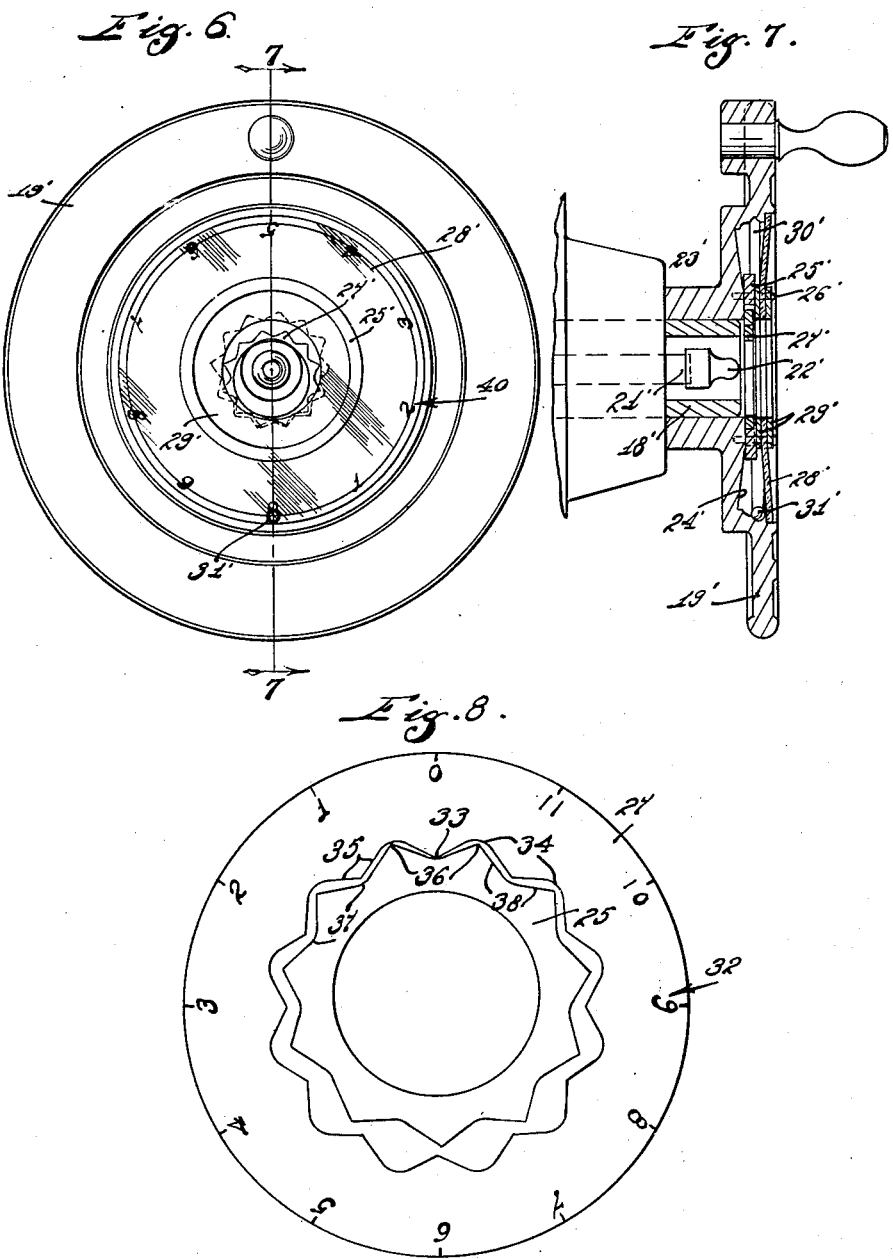

March 6, 1945. W. R. PERRY ET AL 2,370,992
REVOLUTION INDICATOR
Filed Aug. 3, 1940 4 Sheets-Sheet 4
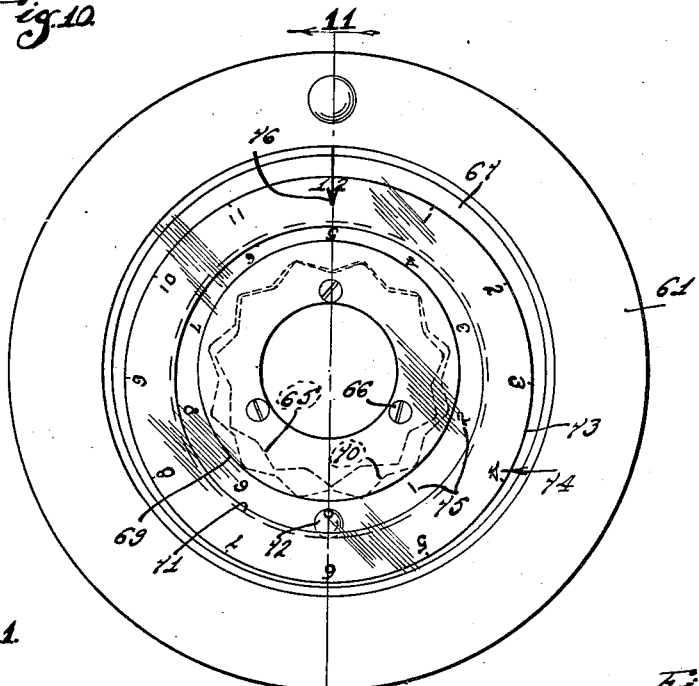
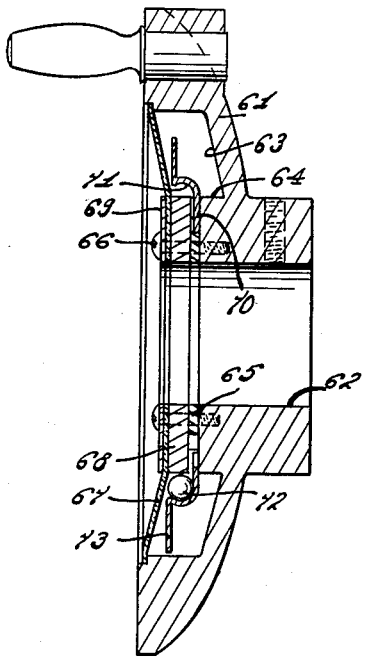
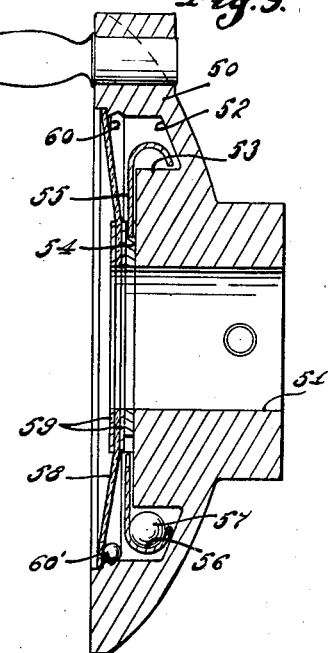
INVENTOR.
William R. Perry and
Paul B. Reeves,
BY Hood & Hahn
ATTORNEYS.

Patented Mar. 6, 1945

2,370,992

UNITED STATES PATENT OFFICE 2,370,992

REVOLUTION INDICATOR

William R. Perry and Paul B. Reeves, Columbus, Ind., assignors to Reeves Pulley Company, Columbus, Ind., a corporation of Indiana Application August 3, 1940, Serial No. 350,900

18 Claims. (Cl. 116—124)

The present invention relates to a revolution indicator, and is concerned primarily with the production of a device adapted to be operatively secured to a member mounted for rotation upon a horizontal axis, and operable to count and to indicate the number of revolutions through which said member has been turned from a given datum point, and to indicate, as well, fractions of revolutions through which said member has been turned.

It is a primary object of the invention to provide a device of the character above described which shall be unusually inexpensive, simple in construction, and free from probabilities of disorder, while being highly accurate in operation. Further objects of the invention will appear as the description proceeds.

To the accomplishment of the above and related objects, our invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a plan view, partly in section, of a variable speed transmission including an element the revolutions of which are to be counted, and showing my revolution indicator associated therewith;

Fig. 2 is an enlarged fragmentary view showing the said revolution indicator in transverse section;

Fig. 3 is a front elevation of said indicator;

Fig. 4 is a view similar to Fig. 2, but showing a modified form of indicator mechanism;

Fig. 5 is a front elevation of the indicator mechanism illustrated in Fig. 4;

Fig. 6 is a view similar to Fig. 3 but showing a further modified form of indicator;

Fig. 7 is a transverse section taken substantially on the line 7—7 of Fig. 6 and looking in the direction of the arrows;

Fig. 8 is an elevation of the indicator illustrated in Fig. 5, taken upon an enlarged scale, and showing the indicator dial in reversed position;

Fig. 9 is a vertical section through a further modified form of our invention;

Fig. 10 is an elevation, similar to Fig. 3, of a still further form; and

Fig. 11 is a section taken on the line 11—11 of Fig. 10 and looking in the direction of the arrows.

While the applicability of the invention herein disclosed is by no means limited thereto, we have shown our revolution indicator associated with the shifting screw of a variable speed transmission of standard type. In such a device, it is desirable for the operator to have available an indicator which may read either in speed ratios, output speeds, or arbitrary units, to indicate the position of the shiftable disc with relation to its fellow, so that the operator can set his transmission to a predetermined point without experimentation. Various types of indicators have been used in connection with such organizations in the past, but we have devised what we consider to be the simplest accurate indicator usable with such device.

Of course, the indicator of the present invention may be used in numerous other installations, and wherever the rotational position of an element with reference to a datum point is desired to be indicated.

In the accompanying drawings, we have illustrated a variable speed drive comprising a housing 10 in which is mounted a drive shaft 11 to which is secured a coned disc 12. A mating coned disc 13 is mounted for axial reciprocation with respect to the disc 12, whereby the effective diameter of the pulley formed by the discs 12 and 13 may be varied to affect the position of the belt 9. The said belt 9 drives to a resiliently expansible V-pulley (not shown) mounted on the driven shaft 8.

An anti-friction bearing 14 is axially fixed to the hub of the disc 13, and a bearing housing 15 is secured to said bearing, an equalizer ring 15' being pivotally mounted upon the housing 15. A yoke 16 is pivotally secured to the ring 15', and is carried upon a nut 17 threadedly mounted upon an actuating screw 18 which is non-reciprocably supported in a cover 20 for the housing 10. A hand wheel 19 is secured to the screw shaft 18 outside the housing 10. All of this construction is illustrated in the patent to P. B. Reeves 2,089,711, issued August 10, 1937.

According to the present invention, the hand wheel 19 is provided with a hub 23 which telescopes over, and is secured upon, the projecting end of the screw shaft 18. Said hand wheel is formed with a socket 24 opening through the outer face of the hand wheel. Concentrically mounted within the socket is an external gear 25 of peculiar construction which will hereinafter be described in detail. Said gear is secured to the base of the socket by screws 26, or the like, and said gear 25 supports an internal gear 27 which hangs upon the gear 25, with certain teeth only held in mesh with the uppermost teeth of the gear 25 by gravity. As will be seen from a consideration of Figs. 3, 5, and 6, the gear 25 is formed with one tooth less than the number of teeth on the gear 27, so that the lowermost teeth of the gear 27 clear the teeth of the gear 25.

A transparent cover 28 is mounted to close the socket 24 and is held in place by the same screws 26, washers 29 being interposed between said cover 28 and the gear 25 and between said cover and the heads of the screws 26. A guard ring 30, secured to the face of the handwheel 19 by screws 31 or the like, may preferably be provided to hold the outer periphery of the cover 28 in place.

The gear 27 is provided with a peripheral series of numerals 32 each registering with the apex 33 of one of the teeth on said gear 27. It is to be noted that said apices are sharp, while the root areas 34 between the respective teeth are formed on relatively long radiused curves, each tooth apex being merged with the adjacent root areas by plane surfaces 35, all as best shown in detail in Fig. 8.

Similarly, the apices 36 of the teeth on the gear 25 are sharp, the root areas 37 therethrough are formed on relatively long radius curves, and each apex is joined with its adjacent root areas by plane surfaces 38. Because of this peculiar tooth contour, the gear 27 is in single-point contact with the gear 25 most of the time, and never touches the tooth 25 at more than two points.

In the illustrated embodiment of the invention, the gear 25 is formed with eleven teeth and the gear 27 is formed with twelve teeth. Because of the effect of gravity on the gear 27, one full rotation of the gear 25 will cause an eleven-tooth movement of the gear 27. Otherwise stated, the gear 27 lags behind the gear 25 to the extent of one tooth per revolution. Thus, if the hand wheel 19 of Fig. 3 is turned through one full revolution in a clockwise direction, the gear 27 will be turned in a clockwise direction a distance 30 degrees less than one full revolution, so that the numeral "1" on said gear 27 will be brought into registry with the pointer 39 formed on the handwheel 19. Similarly, each further clockwise revolution of the hand wheel 19 will result in a relative movement of the gear 27, 30 degrees in a counterclockwise direction with respect to the gear 25.

Conversely, each counterclockwise revolution of the hand wheel 19 will result in a relative movement of the gear 27, 30 degrees clockwise with respect to the gear 25.

In many locations, the device as thus far described will operate satisfactorily; but in the application illustrated there frequently occur periods of relatively heavy vibration. In the absence of restraining means, such vibration will sometimes cause vertical reciprocation of hanging gear 27, which occasionally will result in misregistration of the teeth of the respective gears, so that the gear 27 will be rotatively moved relative to the gear 25 without rotation of the handwheel. This, of course, destroys the proper calibration of the instrument and produces faulty readings.

To cure this trouble, we provide a ring 40 journalled, through the medium of a complete series of balls 41, upon a hub-like forward concentric projection 42 within the socket 24. The ring 40 is provided at one point in its periphery with a weight 43, whereby said ring is gravity-held against rotation with the hand wheel; and at a point diametrically opposite the center of mass of the weight 43, the ring carries a radial arm 44 terminating in an axially forwardly projecting finger 45. As is clearly shown in Fig. 2, the gear 27 is formed to provide a peripheral shoulder 46, and the finger 45 closely overlies the currently uppermost portion of that shoulder at all times; being hidden from view through the cover 28 by the radially extending flange 47 integral with the gear 27. The clearance between the shoulder 46 and the finger 45 is materially less than the depth of the teeth on the gears 25 and 27, so that the gear 27 is positively held against jumping out of its proper registry with the gear 25.

The embodiment of the invention illustrated in Figs. 4 and 5 is based upon the same principles and differs only in details from the embodiment of Figs. 2 and 3.

In some cases, it is desirable to provide, in variable speed drives of the character illustrated in Fig. 1, means for readily lubricating the sliding joint between the discs 12 and 13; and, in such instances, that lubricant may be supplied by injection into the hollow hub of the disc 12, which may be referred to as a shaft. From said hollow hub, a passage may be provided to permit the flow of lubricant into the joint between the two discs. A conduit 21 is mounted in the end of the said hub and projects through the hollow screw shaft 118 toward the outer end thereof, where said conduit is provided with a lubricating fitting 22. The hand wheel 119, of course, is provided with a central aperture through which the said fitting 22 is accessible. It is therefore desirable that the revolution indicator, mounted in the hand wheel 119, shall likewise be formed to provide a central opening through which the fitting 22 shall be accessible.

In the organization of Figs. 4 and 5, the hand wheel hub 123 telescopes over and is secured upon the end of screw shaft 118. Said hand wheel is formed with a socket 124 opening through its outer face; and in said socket is concentrically secured the external gear 125 corresponding to the gear 25 of Figs. 2 and 3. Said gear 125 is secured in place by screws 126 or the like, and supports a gear 127 like gear 27 of Figs. 2 and 3.

A transparent cover 128 is mounted to close the socket 124 and is held in place by said screws 126, washers 129 being interposed between the cover 128 and the gear 125 and between said cover and the heads of the screws 126.

Between the gears 125 and 127 and the cover 128, the socket 124 is formed with a peripheral groove or trackway 130 in which is mounted a ball 31. Gravity will, of course, hold the ball 31 against movement with the hand wheel 119, retaining said ball 31 always vertically below the center of rotation of the hand wheel 119.

The gear 127 is provided with a peripheral series of numerals like the numerals 32, each registering with the apex of one of the teeth on said gear 127. Said teeth are formed like the teeth on the gear 27, and the teeth on the gear 125 are likewise formed like the teeth on the gear 25. Thus, the operation of the gear 127 in response to rotation of the hand wheel 119 is in all respects like the operation of the gear 27.

This form of the invention is reasonably well adapted to installations not subject to material vibration or shocks, but no provision is made therein to prevent the gear 127 from jumping out of proper registration with gear 125. In this form, however, I have provided means for readily reading fractional revolutions as well as complete revolutions of the hand wheel 119. Thus, while complete revolutions are read from the relation between the datum line 139 on the cover and the numerals on the gear 127, the cover 128 is likewise formed with a peripheral series 140 of numerals which may preferably divide the periphery of said cover into tenths. The numeral 0 in the series 140 will register with the ball 31 whenever any numeral on the gear 127 registers directly with the datum line 139. Obviously, then, a clockwise movement of the hand wheel 119 through one-tenth of a revolution will bring the numeral "1" into registry with the ball 31; and so on through the entire range of movement of the hand wheel 119.

In Fig. 8, the gear 27 has been reversed with respect to its position in Fig. 3; and it will be noted that the numerals 32 shown in Fig. 6 are arranged in a counterclockwise series as compared with the clockwise series of Fig. 3.

In Figs. 6 and 7, we have illustrated a modified form of the invention, in which the hub 23' of the hand wheel 19' is mounted upon the projecting end of the screw shaft 18', the conduit 21' and lubricating fitting 22' being shown. The hand wheel 19' is formed with a socket 24' to the base of which is secured an internal gear 25' concentric with the hub 23' and held in place by screws 26' or the like. An external gear 27' is received within the inner periphery of the gear 25', and its lowermost teeth rest in mesh with the lowermost teeth of the gear 25', while its uppermost teeth are clear of the teeth of the gear 25'. In this form of the invention, a numeral series, similar to the series 32 of Fig. 8, is formed upon the external gear 27', and said external gear 27' is provided with the twelve teeth while the internal gear 25' is provided with thirteen teeth. A transparent cover 28' closes the socket 24' and washers 29' space said cover from the gear 25' and from the heads of the screws 26'. As in the embodiment of Figs. 4 and 5, the socket 24' is formed with a peripheral trackway 30' in which is received a ball 31' for registry with the numeral series 40' on the cover 28'.

The action of this embodiment of the invention is closely similar to that hereinabove described. However, instead of lagging behind the fixed gear, the gravity affected gear of this form of the invention will be accelerated with respect to the fixed gear, and will be carried through 30 degrees more than one full revolution by each full revolution of the hand wheel 19'.

Two other expedients for inhibiting jumping of the gravity-suspended gear in an organization of the character here under consideration are illustrated in Figs. 9, 10, and 11.

In Fig. 9, we have shown a hand wheel 50 formed with a central bore 51 whereby the same may be mounted upon a rotatable element. In its front face, said hand wheel is formed with a socket or recess 52 into which projects a concentric hub 53. Mounted upon the outer end of said hub 53 and concentric with the bore 51 is an annulus 54 similar to the element 25, and similarly formed with external teeth. An annulus 55, formed with a larger number of teeth, rests upon the annulus 54 with its uppermost teeth in meshing engagement with the adjacent teeth of the annulus 54. In the illustrated embodiment, the annulus 54 will be provided with eleven teeth while the annulus 55 will be provided with twelve teeth.

At its outer periphery, the element 55 is bent to form a channel 56 in which is received a ball 57, or equivalent element. Said ball 57 rides freely in the channel 56 and will remain always in the lowermost portion of said channel; the diameter of said ball being such that said ball will engage the hub 53 upon very slight upward movement of the annulus 55, and before disengagement of the teeth of the annulus 55 from the teeth of the annulus 54. Thus, accidental shifting of the annulus 55 with respect to the annulus 54 is prevented.

As in the above described embodiments of our invention, a transparent cover 58 is secured to the hub 53 to close the socket 52, said cover being spaced from the annulus 54 and from the heads of the fastening means by washers 59 or the like. As in the previously disclosed embodiments of the invention, the socket 52 is formed with a peripheral raceway 60 in which is received a ball 60'. The cover 58 is provided with a series of graduations for registry with the ball 60', and the annulus 55 is provided with a series of graduations for registry with a reference mark which may preferably be provided on the cover element 58.

In Figs. 10 and 11, we have disclosed a still further embodiment of our invention, comprising a hand wheel 61 formed with a concentric bore 62, an outwardly facing socket 63, and a concentric hub 64 projecting into said socket. An externally toothed annulus 65 is concentrically fixed to the front face of the hub 64, being held in place by screws 66, or the like. A transparent cover 67 is likewise secured in place to close the socket 63, being held in position by the screws 66 and spaced from the annulus 65 by a ring 68 and from the heads of the screws 66 by a washer 69.

An annulus 70, formed with internal teeth similar to the teeth of the annulus 55, rests upon the annulus 65 with its uppermost teeth meshing with the uppermost teeth of said annulus 65. Intermediate its inner and outer peripheries, said annulus 70 is bent to provide a channel 71 in which is received a freely rolling ball 72 or other equivalent element. Said ball 72 is of such diameter that, upon upward movement of the annulus 70 with respect to the annulus 65, said ball will engage the outer periphery of the ring 68 before the teeth of the annulus 70 become disengaged from the teeth of the annulus 65. Beyond the channel 71, the annulus 70 is formed with a radially extending flange 73.

Said flange 73 is provided with a peripheral series of graduations 74 adapted to register with a reference point 76 on the cover 67; while the cover itself is provided with a series of graduations 75 adapted to register with the ball 72 which will, of course, remain always at the lowermost point of the channel 71.

As in the previously described embodiments of the invention, the graduations 74, reading against the reference point 76, will indicate the number of complete revolutions through which the hand wheel 61 has been turned from the datum point; while the graduations 75, reading against the ball 72, will indicate fractions of revolutions through which the hand wheel has been turned. In this embodiment of the invention, the ball 72 performs the dual functions of indicating fractions of revolutions, and of preventing dislodgment of the annulus 70 with respect to the annulus 65.

It will be obvious that, although such a construction would not be so accurate as those hereinabove described, and would be more subject to disorders, some of the advantages of the described organization could be attained through the use of two annuli unprovided with teeth but having frictional engagement between their respective inner and outer peripheries. It will also be obvious that, although we have shown the invention in association with an organization in which it is desirable to provide access through the indicator, if the invention is used in other organizations, the elements corresponding to the elements 25 and 27 need not both be annuli.

I claim as my invention:

1. For use with a shifting screw operatively associated with a member mounted on a hollow shaft, said screw being hollow to permit the projection therethrough of a lubricating fitting communicating with the interior of said shaft, a revolution counter comprising an annulus fixed to said screw concentric therewith and provided with an external series of peripheral teeth, and a second annulus provided with an internal series of peripheral teeth, said second annulus being hung upon said first annulus, and the number of teeth in said respective series being unequal, the openings through said annuli registering with the open ends of said screw and shaft.

2. For use with a shifting screw operatively associated with a member mounted on a hollow shaft, said screw being hollow to permit the projection therethrough of a lubricating fitting communicating with the interior of said shaft, a revolution counter comprising an annulus fixed to said screw concentric therewith and provided with an internal series of peripheral teeth, and a second annulus provided with an external series of peripheral teeth, said second annulus being supported within said first annulus, and the number of teeth in said respective series being unequal, the openings through said annuli registering with the open ends of said screw and shaft.

3. A revolution indicator unit comprising a hand wheel formed for operative association with a rotatable member and provided wtih a substantially concentric socket in one face, an internal gear concentrically fixed within said socket, and an external gear resting within said internal gear with certain of its teeth engaging the lowermost teeth of said internal gear and with others of its teeth out of mesh with the other teeth of said internal gear.

4. A revolution indicator unit comprising a hand wheel formed for operative association with a rotatable member and provided with an outwardly opening substantially concentric socket in one face, an external gear concentrically fixed within said socket, and an internal gear hanging upon said external gear with certain of its teeth engaging the uppermost teeth of said external gear and with others of its teeth out of mesh with the other teeth of said external gear.

5. A revolution indicator unit comprising a hand wheel formed for operative association with a rotatable member and provided with a substantially concentric socket in one face, said socket further being formed with a peripheral trackway, an internal gear concentrically fixed within said socket, and an external gear resting within said internal gear with certain of its teeth engaging the lowermost teeth of said internal gear and with others of its teeth out of mesh with the other teeth of said internal gear, said external gear being provided with a series of figures on its outermost face, an element received in said trackway and held by gravity against movement with said wheel, and a transparent cover closing said socket and provided with a series of indicia registrable successively with said element.

6. A revolution indicator unit comprising a hand wheel formed for operative association with a rotatable member and provided with a substantially concentric socket in one face, said socket further being formed with a peripheral trackway, an internal gear concentrically fixed within said socket, and an external gear resting within said internal gear with certain of its teeth engaging the lowermost teeth of said internal gear and with others of its teeth out of mesh with the other teeth of said internal gear, said external gear being provided with a series of figures on its outermost face, an element received in said trackway and held by gravity always in the lowermost portion of said trackway, and a transparent cover closing said socket.

7. In a device of the class described, an internal gear, an external gear having fewer teeth than said internal gear, one of said gears being substantially concentrically fixed to a rotatable member and the other being reversibly supported upon said one gear with certain of its teeth only in mesh and alternatively with either of its faces directed outwardly from said one gear, said supported gear being provided on one face with a series of figures in clockwise rotation and on its opposite face with a series of figures in counterclockwise rotation.

8. In combination, an internal gear and an external gear mounted for relative rotation upon separate horizontal axes within the circumference of said internal gear, each tooth of each gear being sharply pointed at its apex, and the root area between teeth being formed as a long radiused curve.

9. In combination, an internal gear and an external gear mounted for relative rotation upon separate horizontal axes within the circumference of said internal gear, each tooth of each gear being sharply pointed at its apex, the root area between teeth being formed as a long radiused curve, and each apex being joined to each adjacent root area by a plane surface.

10. A revolution indicator unit comprising a hand wheel formed for operative association with a rotatable member and provided with a substantially concentric socket in one face, an external gear concentrically fixed within said socket, an internal gear hanging upon said external gear with certain of its teeth engaging the uppermost teeth of said external gear and with others of its teeth out of mesh with the other teeth of said external gear, and means limiting trans-axial movement of said internal gear to prevent disengagement of said engaged teeth.

11. In combination with a member mounted for rotation on a horizontal axis, an external gear concentrically fixed to said member, an internal gear hanging from said external gear, said internal gear having more teeth than said external gear and having its uppermost teeth only engaged with teeth of said external gear, said internal gear being formed to provide an annular channel closely surrounding a substantially cylindrical portion of said member, and an element received in said channel and gravity-influenced to remain in the lowermost portion of said channel, the distance between said element and said substantially cylindrical portion being less than the depth of the teeth of either of said gears.

12. In combination with a member mounted for rotation on a horizontal axis, an external gear concentrically fixed to said member, an internal gear hanging from said external gear, said internal gear having more teeth than said external gear and having its uppermost teeth only engaged with teeth of said external gear, said internal gear being formed to provide an annular channel closely surrounding a substantially cylindrical portion of said member and an element received in said channel and gravity-influenced to remain in the lowermost portion of said channel, the distance between said element and said substantially cylindrical portion being less than the combined depth of the engaged teeth of said gears.

13. A revolution indicator unit comprising a hand wheel formed for operative association with a rotatable member and provided with a substantially concentric socket in one face, said socket further being formed with an annular trackway, an external gear concentrically fixed within said socket, and an internal gear hanging from said external gear with certain of its teeth engaging the uppermost teeth of said external gear and with others of its teeth out of mesh with the other teeth of said external gear, said internal gear being provided with a series of figures on its outermost face, an element received in said trackway and held by gravity against rotation with said handwheel, and a transparent cover closing said socket.

14. A revolution indicator unit comprising a hand wheel formed for operative association with a rotatable member and provided with a substantially concentric socket in one face, an external gear concentrically fixed within said socket, and an internal gear hanging from said external gear with certain of its teeth engaging the uppermost teeth of said external gear and with others of its teeth out of mesh with the other teeth of said external gear, said internal gear being provided with a series of figures on its outermost face and being formed to provide an annular, outwardly facing channel intermediate said series of figures and its teeth, an element received in said channel and held by gravity always in the lowermost portion of said channel, a transparent cover closing said socket and through which said last-named element and said series of figures are visible, and means within said socket and located at all times a distance above said last-named element less than the depth of engagement of the engaged teeth of said respective gears.

15. A revolution indicator comprising an element fixed to a rotatable member, said element being formed with a peripheral series of teeth, and a second element formed with a peripheral series of teeth and freely supported on said first element, said two series of teeth being unequal in number and certain teeth only of said second element being held in mesh with teeth of said first element solely by gravity, and means normally out of contact with said element but positioned to prevent material movement of said second element against the effect of gravity.

16. A revolution indicator comprising an external gear mounted for rotation on a horizontal axis, an internal gear hanging by gravity upon said external gear and having a coaxial annular shoulder projecting from one face thereof, the teeth of said internal gear being greater in number than the teeth of said external gear, a ring journalled on the axis of rotation of said external gear and gravity-biased against rotation therewith, and a finger carried by said ring and positioned immediately above, and just out of contact with, the currently-uppermost portion of said shoulder at all times.

17. A revolution indicator comprising an element fixed to a rotatable member, said element being formed with a peripheral series of teeth, and a second element formed with a peripheral series of teeth and supported on said first element, said two series of teeth being unequal in number, and each tooth of each gear being sharply pointed at its apex, and the root area between teeth being formed as a long radiused curve.

18. A revolution indicator comprising an element fixed to a rotatable member, said element being formed with a peripheral series of teeth, and a second element formed with a peripheral series of teeth and supported on said first element, said two series of teeth being unequal in number, and each tooth of each gear being sharply pointed at its apex, the root area between teeth being formed as a long radiused curve, and each apex being joined to each adjacent root area by a plane surface.

WILLIAM R. PERRY.
PAUL B. REEVES.

CERTIFICATE OF CORRECTION.

Patent No. 2,370,992.

March 6, 1945.

WILLIAM R. PERRY, ET AL.

It is hereby certified that error appears in the printed specification of the above numbered patent requiring correction as follows: Page 4, second column, line 28, claim 7, after the word "being" insert --substantially symmetrical on opposite sides of the median plane between its said faces and being--; line 31, same claim, after "rotation" and before the period insert --, and means supported upon a part of said device rotatable with respect to said reversible gear, said means cooperating as a reference index with that series of numbers carried on the outwardly directed face of said reversible gear to indicate the position of said rotatable member--; page 5, second column, line 12, claim 15, for "said element" read --said second element--; and that the said Letters Patent should be read with this correction therein that the same may conform to the record of the case in the Patent Office.

Signed and sealed this 19th day of June, A. D. 1945.

Leslie Frazer

(Seal)

Acting Commissioner of Patents.